United States Patent
Samadani et al.

(10) Patent No.: US 12,422,339 B2
(45) Date of Patent: Sep. 23, 2025

(54) SYSTEM, METHOD AND APPARATUS FOR MONITORING THE HEALTH OF RAILCAR WHEELSETS

(71) Applicant: Amsted Rail Company, Inc., Chicago, IL (US)

(72) Inventors: Mohsen Samadani, King of Prussia, PA (US); David Heagerty, Glen Mills, PA (US); Francis Cooper, Downingtown, PA (US); Daniel Maraini, West Chester, PA (US); Andrew Seidel, Camp Hill, PA (US)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

(21) Appl. No.: 18/624,481

(22) Filed: Apr. 2, 2024

(65) Prior Publication Data

US 2024/0328902 A1   Oct. 3, 2024

Related U.S. Application Data

(63) Continuation of application No. 17/836,685, filed on Jun. 9, 2022, now Pat. No. 11,977,003, which is a
(Continued)

(51) Int. Cl.
*G01M 17/10* (2006.01)
*B61K 9/04* (2006.01)
(Continued)

(52) U.S. Cl.
CPC ............... *G01M 17/10* (2013.01); *B61K 9/04* (2013.01); *B61K 9/12* (2013.01); *B61L 25/021* (2013.01);
(Continued)

(58) Field of Classification Search
CPC ...... G01M 17/10; G01M 13/045; B61K 9/04; B61K 9/12; B61L 25/021; B61L 15/0027;
(Continued)

(56) References Cited

U.S. PATENT DOCUMENTS

| 5,433,111 A | 7/1995 | Hershey et al. |
| 7,705,743 B2 | 4/2010 | Barone et al. |

(Continued)

FOREIGN PATENT DOCUMENTS

| EP | 3181428 | 6/2017 |
| GB | 2546087 | 7/2017 |
| WO | 2011029526 | 3/2011 |

OTHER PUBLICATIONS

Supplementary European Search Report issued in European Patent Application No. 19753992.7, dated Oct. 21, 2021 (10 pages).
(Continued)

*Primary Examiner* — Walter L Lindsay, Jr.
*Assistant Examiner* — Geoffrey T Evans
(74) *Attorney, Agent, or Firm* — Fox Rothschild LLP; Carol E. Thorstad-Forsyth

(57) ABSTRACT

A system and method for monitoring the operating condition of a wheelset on a railcar comprising a sealed unit mounted on or near a wheelset of the railcar for collecting data from the wheelset and performing AI analyses on the collected data to determine the operational condition and predict failure modes for the wheelset. Results are communicated off-railcar wirelessly via one or more of several different methods.

33 Claims, 11 Drawing Sheets

Related U.S. Application Data continuation of application No. 16/277,340, filed on Feb. 15, 2019, now Pat. No. 11,385,137.

(60) Provisional application No. 62/631,279, filed on Feb. 15, 2018.

(51) Int. Cl.
  *B61K 9/12*      (2006.01)
  *B61L 25/02*     (2006.01)
  *F16C 19/52*     (2006.01)
  *G01M 13/045*    (2019.01)
  *G06N 20/00*     (2019.01)
  *H04W 84/18*     (2009.01)

(52) U.S. Cl.
  CPC ............ *F16C 19/52* (2013.01); *F16C 19/527* (2013.01); *G01M 13/045* (2013.01); *G06N 20/00* (2019.01); *F16C 2233/00* (2013.01); *F16C 2326/10* (2013.01); *H04W 84/18* (2013.01)

(58) Field of Classification Search
  CPC .... B61L 15/0081; F16C 19/52; F16C 19/527; F16C 2233/00; F16C 2326/10; G06N 20/00; H04W 84/18
  See application file for complete search history.

(56) References Cited

U.S. PATENT DOCUMENTS

| | | |
|---|---|---|
| 9,707,982 B1 | 7/2017 | Byford et al. |
| 2007/0064244 A1 | 3/2007 | Mian et al. |
| 2013/0325762 A1 | 12/2013 | Raileanu et al. |
| 2016/0272228 A1 | 9/2016 | LeFebvre et al. |
| 2017/0106885 A1 | 4/2017 | Singh |
| 2017/0199101 A1 | 7/2017 | Franchitti |
| 2017/0212142 A1 | 7/2017 | Salzgeber |
| 2017/0220949 A1 | 8/2017 | Feng et al. |
| 2018/0003588 A1* | 1/2018 | Iwanami .................. G06N 5/04 |
| 2018/0222504 A1 | 8/2018 | Birch et al. |
| 2018/0273066 A1 | 9/2018 | Mulligan |
| 2019/0204390 A1* | 7/2019 | Krishnamoorthi .... H02P 29/024 |
| 2019/0225248 A1 | 7/2019 | Lidgett et al. |
| 2020/0290658 A1 | 9/2020 | Vincent et al. |

OTHER PUBLICATIONS

International Search Report and Written Opinion issued in PCT/US2019/018231, dated May 1, 2019 (10 pages).

* cited by examiner

SYSTEM, METHOD AND APPARATUS FOR MONITORING THE HEALTH OF RAILCAR WHEELSETS

RELATED APPLICATIONS

This application is a U.S. Continuation Application Based on U.S. Non-Provisional patent Ser. No. 17/836,685, which was filed on Jun. 9, 2022, which is a continuation of U.S. Non-Provisional patent Ser. No. 16/277,340, which was filed on Feb. 15, 2019, and which claims the benefit of U.S. Provisional Application No. 62/631,279, filed Feb. 15, 2018. The contents of these applications are fully incorporated in their entireties into this document by reference.

FIELD OF THE INVENTION

This application relates to sensors, systems, and techniques for monitoring conditions on a vehicle. More specifically, this application relates to rail vehicles and to an onboard system for monitoring wheelsets on a railcar, including conducting diagnostics, recognizing and predicting failure modes and otherwise managing the overall health and/or status of the wheelset.

BACKGROUND OF THE INVENTION

Condition monitoring is the process of monitoring a parameter of operation in machinery, for example, a parameter of vibration, temperature etc., to identify a change that might indicate a developing fault. One of the objectives of condition monitoring is to suggest the undertaking of preventative maintenance actions before anticipated damages or failures occur. In this way, condition monitoring can address conditions that might shorten the normal lifespan of a component before an incident or failure occurs. As such, the service life of wheels and bearings may be extended. Condition monitoring techniques are commonly used on rotating equipment, auxiliary systems and other machinery, such as compressors, pumps, electric motors, internal combustion engine and presses.

In the rail industry, condition monitoring is typically limited to wayside systems located along railroad tracks in which data is collected by off-board monitors, typically using acoustic sensors, vibration sensors, machine vision systems, strain based measurements, and pyro metric temperature sensors. However, wayside systems can sometimes be unreliable and lack accuracy.

Conversely, onboard monitoring techniques can provide a greater degree of accuracy. However, existing onboard monitoring techniques present various problems. For instance, many of these techniques are limited to temperature measurements that can only detect the failing components in the final stages, just prior to the point of failure. Additionally, systems that use vibration analysis on the remote server are often very limited in terms of signal measurement quality, and processing power.

Other issues with existing condition monitoring systems and techniques in the rail industry include, but are not limited to, the use of low sampling rates, limited processing power, failure to incorporate advanced analytics algorithms (including machine learning and deep learning), failure to communicate with wayside tag readers, lack of an advanced power management system, and the lack of a solution for wheel speed measurement. It has become increasingly important for railway owners, shippers and leasing companies to be able to monitor the condition of assets, including railcars, locomotives and train consists on a real time basis.

SUMMARY OF THE INVENTION

Described herein are systems, apparatuses and methods for condition monitoring of a railcar, and in particular, of the health of wheels and bearings on a railcar, that is capable of monitoring the condition of components based on temperature, weight, speed and vibration signatures, and further is capable of predictive failure detection. The described technology uses powerful hardware components (e.g., accelerometers, processors, RAM, etc.) as well as other unique design features, such as a unique wheel position sensor and a unique mounting configuration on the bearing adapter, among others. These features allow for the performance of more complex analysis, including, for example, the use of machine learning and deep learning models to predict failure modes that existing systems are not capable of predicting. The advantages of the hardware design of the system, coupled with the predictive analytics, will result in much more accurate and reliable predictions than with prior art systems.

One embodiment of the invention provides a Wheelset Health System (WHS) implemented as a wireless sensor node, which acts as a node in a railcar-based network. The railcar-based network may have, in some embodiments, a mesh, tree or star topology. The railcar-based network may include other nodes for sensing other parameters of the railcar operation. The nodes on each railcar may be formed into an ad hoc network organized by a communications management unit (CMU). The communication management unit provides the ability to collect data and warnings of existing or pending failure modes from the various nodes in the railcar network and report that data either off-railcar or to an operator in the locomotive.

In a typical train consist, each railcar will have a local railcar-based network controlled by a communications management unit. In certain embodiments, the communication management units of each railcar in the consist will form a train-based network controlled by a powered wireless gateway, which may act as a gateway for communication of the monitoring system with off-train facilities or to an operator in the locomotive.

In other embodiments, the WHS may be implemented as a standalone unit which communicates wirelessly with wayside detectors as a means of exporting data, and/or results of data analyses off-railcar.

BRIEF DESCRIPTION OF THE DRAWINGS

The following detailed description will be better understood when read in conjunction with the figures appended hereto. For the purpose of illustrating the invention, there is shown in the drawings a preferred embodiment. It is understood, however, that this invention is not limited to these embodiments or the precise arrangements shown.

DETAILED DESCRIPTION OF THE INVENTION

Figure 1:
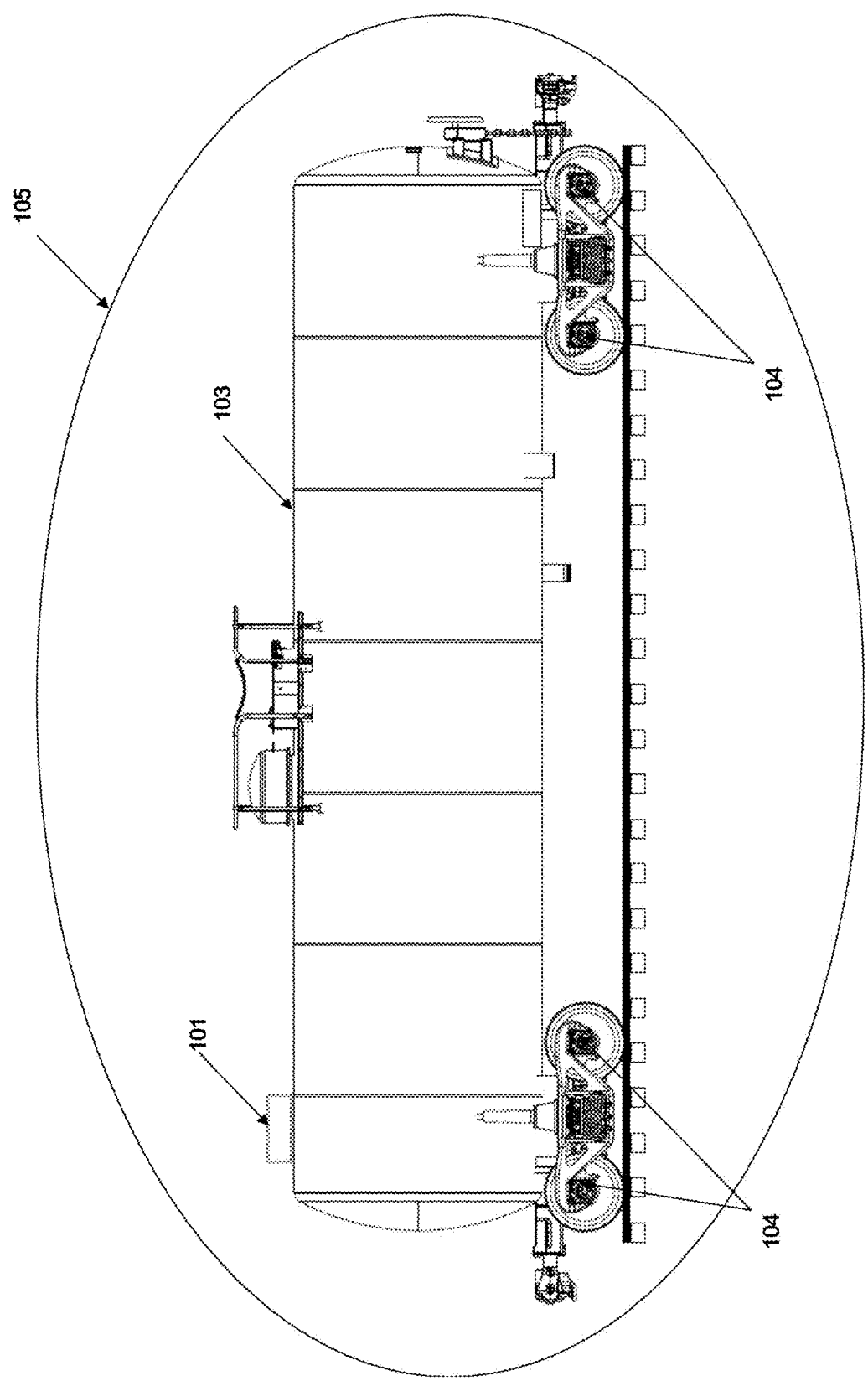
FIG. 1 is a schematic showing the railcar-based network in which the WHS described herein may be a wireless sensor node.

A wheelset is an assembly comprising an axle, two wheels and two bearings. "Wheelset" is a term of art in the railroad industry.

A train consist, shown in the drawings as reference number 209, is defined as a connected group of railcars 103 and locomotives 208.

A wireless sensor node ("WSN"), shown in the drawings as reference number 104, is located on a railcar 103. The WSN is preferably deployed in a self-contained, protective housing, and may include one or more sensors, a power source and communication circuitry which allows the WSN 104 to communicate with the CMU 101 in the railcar-based network. The WSN 104 may also include an intelligent capability to analyze the data collected from the one or more sensors and to determine if the data needs to be transmitted immediately, held for later transmission, or aggregated into an event or alert. The WSN 104 is used for sensing a parameter to be monitored (e.g. temperature of bearings or ambient air) or status (e.g., position of a hatch or hand brake). All WSNs 104 on a single railcar 103 form a railcar-based network 105 controlled by a CMU 101. Examples of WSNs 104 are disclosed in published U.S. patent application 2013/0342362, the disclosure of which is hereby incorporated by reference herein.

A communication management unit ("CMU"), shown in the drawings as reference number 101, is located on a railcar 103 and controls the railcar-based network 105 overlaid on railcar 103. The CMU 101 hardware preferably includes a processor, a power source (e.g. a battery, solar cell or internal power-harvesting capability), a global navigation satellite system device such as a global positioning system ("GPS") receiver, Wi-Fi, satellite, and/or cellular capability, a wireless communications capability for maintaining the railcar-based network 105 and, optionally, one or more sensors, including, but not limited to, an accelerometer, reed switch or temperature sensor. The CMU 101 supports one or more WSNs 104 in a network configuration using proprietary or open standard protocols, such as the IEEE 2.4 GHz 802.15.4 radio standard. Additionally, the CMU 101 can also be a member of a train-based network 207, which consists of the CMUs 101 from all enabled railcars 103 in the train consist 209, controlled by a powered wireless gateway 202, typically located on a locomotive 208. The CMU 101 thus supports four functions: 1) to manage a low-power railcar-based network 105 overlaid on a railcar 103; 2) to consolidate data from one or more WSNs 104 in the railcar-based network 105 and to apply logic to the data gathered to generate warning alerts. In various embodiments, the warning alerts may be communicated to a host such, as a locomotive 208, or to a remote railroad operations center 220; 3) to support built-in sensors, such as an accelerometer, within the CMU 101 to monitor specific attributes of the railcar 103 such as location, speed, accelerations and more; and 4) to support bi-directional communication upstream to the host or control point, such as a locomotive 208 if part of a train-based network exists and/or an off-train or off-railcar monitoring and remote railroad operations center 220, or remote server and downstream to one or more WSNs 104, located on the railcar. CMUs 101 may communicate wirelessly to the PWG 202 in a network configuration or may be configured to communicate through a wired connection, for example, through the ECP (electronically controlled pneumatic) brake system. Those skilled in the art will appreciate that GPS is just one form of a global navigation satellite system (GNSS). Other types of GNSS include GLONASS, Galileo and BeiDou, etc. with others in development. Accordingly, although GPS is used in the embodiments described herein, any type of GNSS or devices may be used.

The CMU 101 is capable of receiving data and/or alarms from one or more WSNs 104 and is capable drawing inferences from this data and generating alarms regarding the performance of railcar 103, and of transmitting data and alarm information to a remote server. The CMU 101 is preferably a single unit that would serve as a communications link to other locations and have the capability of processing the data received. Other locations could include, but is not limited to, for example, a mobile base station, a powered wireless gateway 202 in the locomotive 208 or a land-based base station. The CMU 101 also communicates with, controls and monitors WSNs 104 in the railcar-based network 105.

A powered wireless gateway ("PWG"), shown in the drawings as reference number 202, is preferably located either on a locomotive 208 or deployed as part of a rail yard-based network. It typically will include a processor, a GPS receiver, a satellite and or cellular communication system, local wireless transceiver (e.g. WiFi), an Ethernet port, a low power, wide area (LPWA) network manager and other means of communication. The PWG 202 will have power supplied by the locomotive 208, if located on a powered asset, such as a locomotive 208, or will derive its power from another source, for example, from a solar power generator or from a high-capacity battery. The PWG 202 controls 1) a train-based network 207 overlaid on a train consist 209, consisting of multiple CMUs 101 from each railcar 103 equipped with a CMU 101 in a train consist 209, 2) isolated CMUs 101 that are not part of a train consist, or 3) a rail yard-based network overlaid on a rail yard 114, consisting of land-based PWGs 116 and CMUs 101 from individual railcars 103 not currently associated with a train consist 209.

The components and configuration of the PWG 202 are similar to that of a CMU 101, with the PWG 202 drawing power from an external source or being self-powered, while the CMU 101 is typically self-powered. Additionally, the PWG 202 collects data and draws inferences regarding the performance of the train consist 209, and train-based network 207, as opposed to CMUs 101, which draw inferences regarding the performance of individual railcars 103 and railcar-based network 105 or 118.

A railcar-based network shown in the drawings as reference number 105, consists of a CMU 101 on a railcar 103, which is part of and manages a railcar-based network 105 of one or more WSNs 104, each deployed, preferably on the same railcar 103 but not necessarily on the same railcar as CMU 101.

A train-based network, shown in the drawings as reference number 207, consists of a powered PWG 202 on a locomotive 208, which is part of and manages a train-based network 207 of a plurality of CMUs 101, each deployed on a railcar 103, wherein the locomotive 208 and plurality of railcars 103 form a train consist 209 and wherein the train-based network 207 is identified by a unique identifier.

The discussion which follows describes the system in the context of a railcar 103, however, it will be understood by one of skill in the art that the same methods are applicable to any asset, railroad vehicle or railroad asset. It should also be noted that the definitions above are not meant to be exclusive, in that defined components may have additional components or features not included in the definition. Furthermore, while the description which follows features a railcar 103 with two trucks, it is applicable to any configuration with more or fewer trucks or axles.

Railcar-Based Network

Referring now to FIG. 1 of the drawings, a railcar-based network is shown generally as reference number 105. Railcar-based network 105 comprises a CMU 101 installed on a railcar 103 and one or more WSNs 104 installed on the same railcar 103. The railcar-based network 105 architecture is a foundational building block of the IEC 62591 international wireless standard as well as the ISA100.11a standard from the International Society of Automation.

Figure 2:
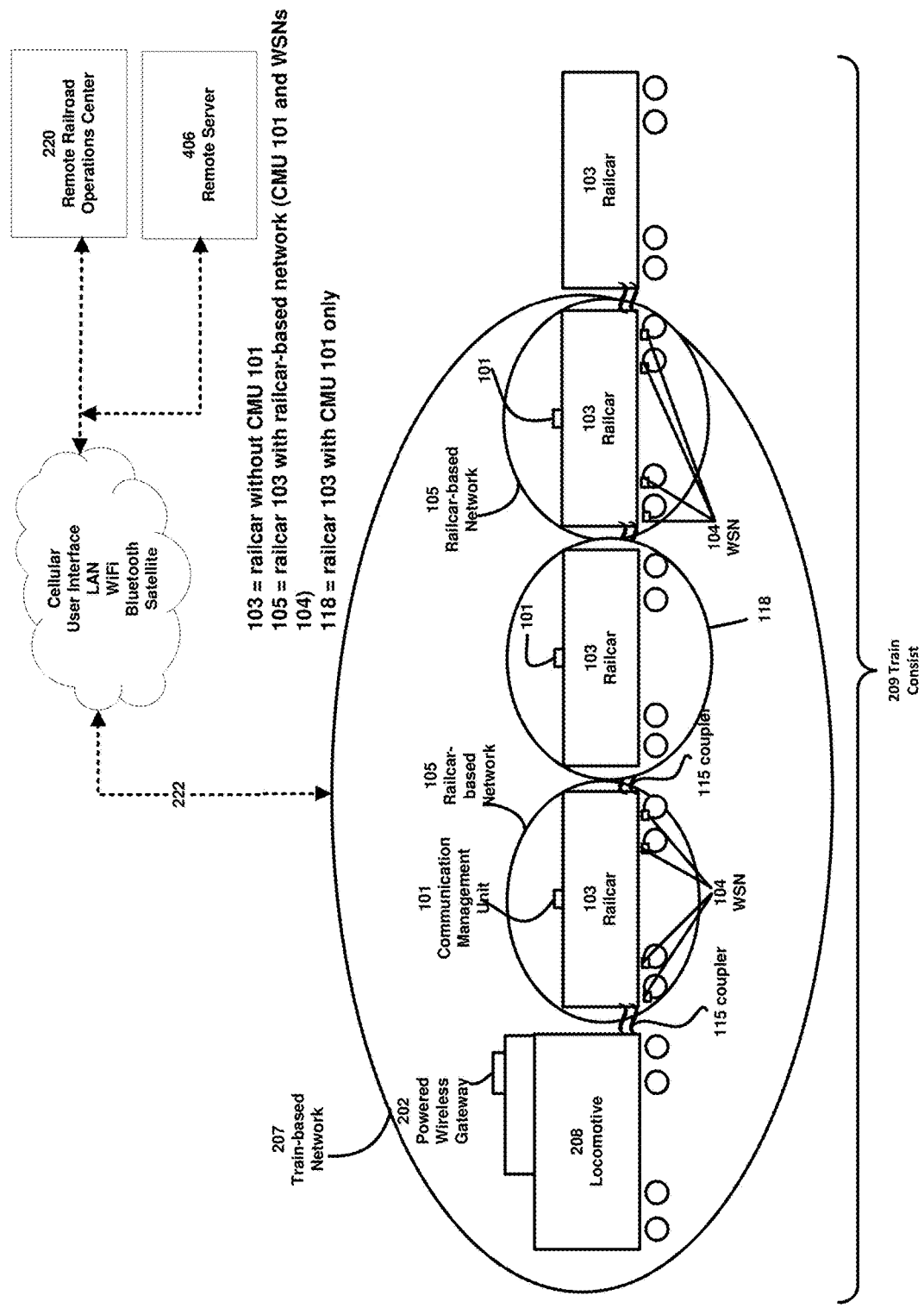
FIG. 2 is a schematic of a train consist showing the train-based network as well as individual railcar-based networks.

In one aspect, the invention provides a novel means for monitoring the performance and operation of a railcar 103 using a railcar-based network 105 overlaid on the railcar 103 and communicating such performance and operational data to a host or control point such as a locomotive 208 of a train consist 209, as shown in FIG. 2. CMU 101, preferably mounted on a railcar 103, controls and retrieves data and alerts from one or more WSNs 104 also deployed on railcar 103. If a problem is detected, alarms are forwarded by CMU 101 for further action to a PWG 202 installed on an asset, preferably with access to a power source and, optionally, to an off-train or off-railcar monitoring and remote railroad operations center 220.

The system provides the ability to receive event and status information from CMU 101 and one or more WSNs 104 installed on a railcar 103. Interfaces are registered to receive events asynchronously, or remote procedures can be called to retrieve information from the CMU 101 in a polling manner. The interface is exposed through a web service or library and is accessible over the local area network 110 through an SSL connection and authenticated with a unique key reserved for each end user.

Referring still to FIG. 1, CMU 101 is affixed directly to the railcar 103 through any suitable means, for example, using self-tapping mounting screws or other metal mounting screws. An additional method of attaching CMU 101 to railcar 103 is to attach directly to a mounting bracket with screws or other metal mounting screws and the said bracket is attached directly to railcar 103 using self-tapping screws or other metal mounting screws. CMU 101 is able to configure one or a more WSNs 104 in a local network to transmit, listen, or sleep at precise times.

CMU 101 on each railcar 103 is capable of supporting an optional global navigation satellite system (GNSS) sensor to determine location, direction and/or speed of railcar 103. Additionally, CMU 101 on each railcar 103 is capable of using built-in sensors and/or managing a railcar-based network 105 on the railcar 103 to generate messages that need to be sent to a host or control point, such as a locomotive 208.

Referring now to FIG. 2, CMU 101 installed on railcar 103 collects data regarding the operation of the railcar 103 from one or more WSNs 104 installed on railcar 103. WSNs 104 transmit data to CMU 101. CMU 101 connects with train-based network 207 overlaid on train consist 209 to transmit data to a powered wireless gateway 202 installed on locomotive 208, to a remote operations center 220 or remote server.

WSNs 104 use a networking protocol designed to lower power consumption, having an integrated radio transceiver and antenna that is certified for operation in the license-free band. Each WSN 104 is equipped with an ultra-low power microcontroller that allows sampling and extensive on-board computations, including fast Fourier transforms (FFTs), digital filtering, and trending or predictive analysis. WSN 104 is powered by high energy density, low self-discharge batteries. In preferred embodiments, the batteries may be lithium. In some embodiments, each WSN 104 may also act as a router that is capable of communicating with any other WSN 104 within communication range and assigned to the railcar-based network 105, thereby creating redundant communication paths within the railcar-based network 105. In other embodiments, a WSN 104 may communicate directly off-railcar with locomotive 208, a remote server 406 or a remote railroad operations center 220.

WSNs 104 can be configured for the parameter or condition to be monitored, for example, the temperature of a bearing, and can be placed on railcar 103 in a location chosen for such monitoring. WSN 104 can have one or multiple sensing devices sensing multiple operational parameters. For example, WSN 104 can include a temperature sensor to monitor bearing temperature, a temperature sensor to measure ambient temperature and an accelerometer. WSN 104 is affixed directly to the railcar 103 by welding, self-tapping mounting screws, other metal mounting screws or other means of attachment, for example, by adhesive.

As an operational example, WSN 104 may sense the temperature of a bearing by virtue of being attached by welding or other means near to the bearing, preferably on the bearing fitting (which may include the bearing, bearing adapter or any other bearing related appendage). Exemplary WSNs 104 have been described in U.S. Published Patent Application 2013/0342362, which is incorporated herein by reference.

Each WSN 104 includes circuitry for wireless communications. Preferably, each WSN 104 on a railcar 103 is formed into an ad hoc railcar-based network 105 with other WSNs 104 on the same railcar 103 and with CMU 101, also preferably mounted on the same railcar 103, as shown in FIG. 1 and FIG. 2. In the preferred embodiment, each WSN 104 of a given railcar 103 would transfer data or alerts to the CMU 101 of that railcar 103. This transfer of data may occur directly, or the data may be relayed by other WSN 104 in the same railcar-based network 105 to CMU 101.

WSNs 104 include a long-term power source. In preferred embodiments, a military grade lithium-thionyl chloride battery may be used. The circuitry includes power conditioning and management functionality and may include a feature to conserve battery life, which keeps WSN 104 in a standby state and periodically or asynchronously wakes WSN 104 to deliver readings from on-board sensors.

The individual WSNs 104 are mounted on the areas of interest on a railcar 103. As an example, FIGS. 1 and 2 show temperature sensing WSNs 104 of the type described above mounted to a bearing fitting of railcar 103. In this particular example, WSNs 104 may be attached to all bearing fittings of each wheel of railcar 103. In addition, other WSNs 104, for example, an ambient temperature sensor WSN 104, may be mounted on different areas of the railcar 103. On a typical railcar 103, in the case where it is desired to monitor bearing temperature, there will be nine WSNs 104 configured with temperature sensors, one on each bearing fitting (at each wheel), and one sensor placed to measure ambient temperature. The ambient temperature sensor will communicate the ambient temperature to CMU 101, which provides this information to the sensors at the bearing fittings as they call for the information. This will allow the WSNs 104 at the bearing fitting to determine the bearing temperature and then determine if further action is required, such as communicating an alarm of high temperature.

To communicate data collected by each WSN 104, each WSN 104 is in two-way communication with CMU 101 mounted on the railcar 103, which collects data from each WSN 104 and can also send instructions to the WSN 104. As previously discussed, CMU 101 and each WSN 104 connected to the same railcar 103 form a local area ad hoc railcar-based network 105, to facilitate communications there between. Message packet exchanges are synchronized so that no packets collide on the railcar-based network 105, and every packet is scheduled and synchronized for energy efficiency. Communication traffic on railcar-based network 105 is protected by end-to-end 128-bit (or higher) AES-based encryption, message integrity checking, and device authentication.

CMU 101 may be capable of performing advanced data analysis, using data collected from multiple WSN 104 and may apply heuristics to draw conclusions based on the analysis.

Train-Based Network

A train-based network is shown generally as reference number 207 in FIG. 1. Train-based network 207 is overlaid on a train consist 209 and is comprised of a PWG 202 installed on a host or control point such as a locomotive 208, or on another asset with access to a power source, and one or more CMUs 101, each belonging to the train-based network 207 and to their respective railcar-based networks 105, if one or more WSNs 104 are present, or respective railcar-based networks 118 for railcars with a CMU 101 but no WSNs. Thus, here, CMUs 101 can belong to two networks, railcar-based network 105 (if railcar 103 is fitted with one or more WSNs 104) and train-based network 207 but is only required to belong to train-based network 207. Each CMU 101 is also optionally managing its respective railcar-based network 105. The railcar-based network 105 is continually monitored by the CMU 101 and is optimized for the ever-changing wireless environment that a moving railcar 103 experiences. Train-based network 207 uses an overlay network to support low-power bi-directional communication throughout train consist 209 and with PWG 202 installed on locomotive 208. The overlaid train-based network 207 is composed of wireless transceivers embedded in the CMU 101 on each railcar 103. Each CMU 101 is capable of initiating a message on the train-based network 207 or relaying a message from or to another CMU 101. The overlay train-based network 207 is created independently of and operates independently of the railcar-based networks 105 created by each railcar 103 in the train consist 209.

A bi-directional PWG 202 manages the train-based network 207 and communicates alerts from the CMUs 101 installed on individual railcars 103 to the host or control point, such as the locomotive 208, wherein the alerts may be acted upon via human intervention, or an automated system. Locomotive 208 may include a user interface for receiving and displaying alert messages generated by train-based network 207 or any of the individual railcar-based networks 105. Bi-directional PWG 202 is capable of receiving multiple alerts, events or raw data from WSNs 104 through CMUs 101 on individual railcars 103 and can draw inferences about specific aspects of the performance of train consist 209.

Bi-directional PWG 202 is capable of exchanging information with an external remote railroad operations center 220, data system or other train management system. This communication path is shown in FIG. 2 as reference number 222, and can include cellular, LAN, Wi-Fi, Bluetooth, satellite, or other means of communications. This link can be used to send alerts off-train or off-railcar regardless of whether or not the train consist 209 is in operation.

Data Processing Platform

The data processing platform is responsible for implementing the intelligence used to process data collected from WSNs 104, CMUs 101 and PWGs 202. Preferably, the data processing platform is distributed among all WSNs 104, and CMUs 101 on a railcar, PWGs 202 on a locomotive and PWGs 116 installed in a rail yard, as well as utilizing a cloud-based infrastructure optimized to work closely with train-based networks 207 and rail yard-based networks, in conjunction with a variety of data streams from third-party providers or external sources.

The data processing platform preferably has an extensible architecture using a distributed complex event processing (DCEP) engine, which can be scaled to support millions of individual pieces of data from train-based systems across a global network. DCEP distributes decision-making to the lowest possible level to avoid the excessive power consumption and bandwidth utilization that would otherwise be required to move large amounts of data from a train-based or railcar-based network to a cloud-based data processing system.

When DCEP is used in conjunction with a CMU 101 or WSN 104 that has DCEP embedded software deployed, the platform has the capacity to filter and execute millions of events per second in real time.

Specific software to detect an event in real time, based on collected data readings is embedded in each CMU 101 and/or WSN 104.

The DCEP engine aggregates data streams, such as events and metadata, through data stream adapters from varied sources to include customer data, environmental data, as well as data from a CMU 101 and a WSN 104. The DCEP comprises data stream adapters, a temporal analysis module, a spatial analysis module, a rules engine and a publisher module.

A temporal analysis module processes data to determine changes in values over time. For example, a WSN 104 is measuring the temperature of a bearing. Said module will determine the change in temperature readings over a specific time period allowing further analysis to be done such as trending.

A spatial analysis module processes data to determine the relative position of an object, in this invention, a railcar 103. The position of a railcar can be compared to a geofence to determine if it is inside or outside of the geofence and can then be compared to a route map to determine if an asset is out of route or off course or similar types of applications. Further, analysis can be performed on a locomotive-based PWG 202.

A rules engine is an application module where detailed operating parameters are stored such that when data from the temporal and spatial modules is sent to said module it will compare the data to the detailed operating parameters. Based on this comparison, only the data determined to be critical is transmitted to a publisher (where the information is destined for another system or user). The rules engine drives filters and logic to the source, which could be a CMU 101, WSN 104, or PWG 202, where it reviews many data points, coalescing the data into practical events such as alerts, reports and dashboards.

Data is processed through the temporal and spatial analysis modules followed by a set of rules engine filters which determine critical from non-critical information based on the specific rule-set defined. Information may be pushed to a third-party integration platform where operational decisions, enterprise resource planning (ERP) transactions, dashboards, and alerts can be actioned.

For example, a CMU 101 is installed on a railcar 103 along with a WSN 104 on the bearing fitting of each wheel to measure bearing temperature. The CMU 101 sends temperature data measured by each bearing WSN 104 based on specific defined parameters to an integration endpoint system (i.e. a cloud based or on-premise server). This data also can be referred to as a data stream from an asset or fleet. At the same time, a data stream from a source providing railcar 103 waybill data is collected by the integration endpoint system where it is aggregated with the asset data stream then processed through specific rules and event filters. The data generated after processing by the filters can be converted into an informational message and as the same time pushed to an end user ERP system or to a web-based interface. The ERP system further may process data and push results to sources such as a maintenance department of a railroad for further action.

Wheelset Health System

Figure 3:
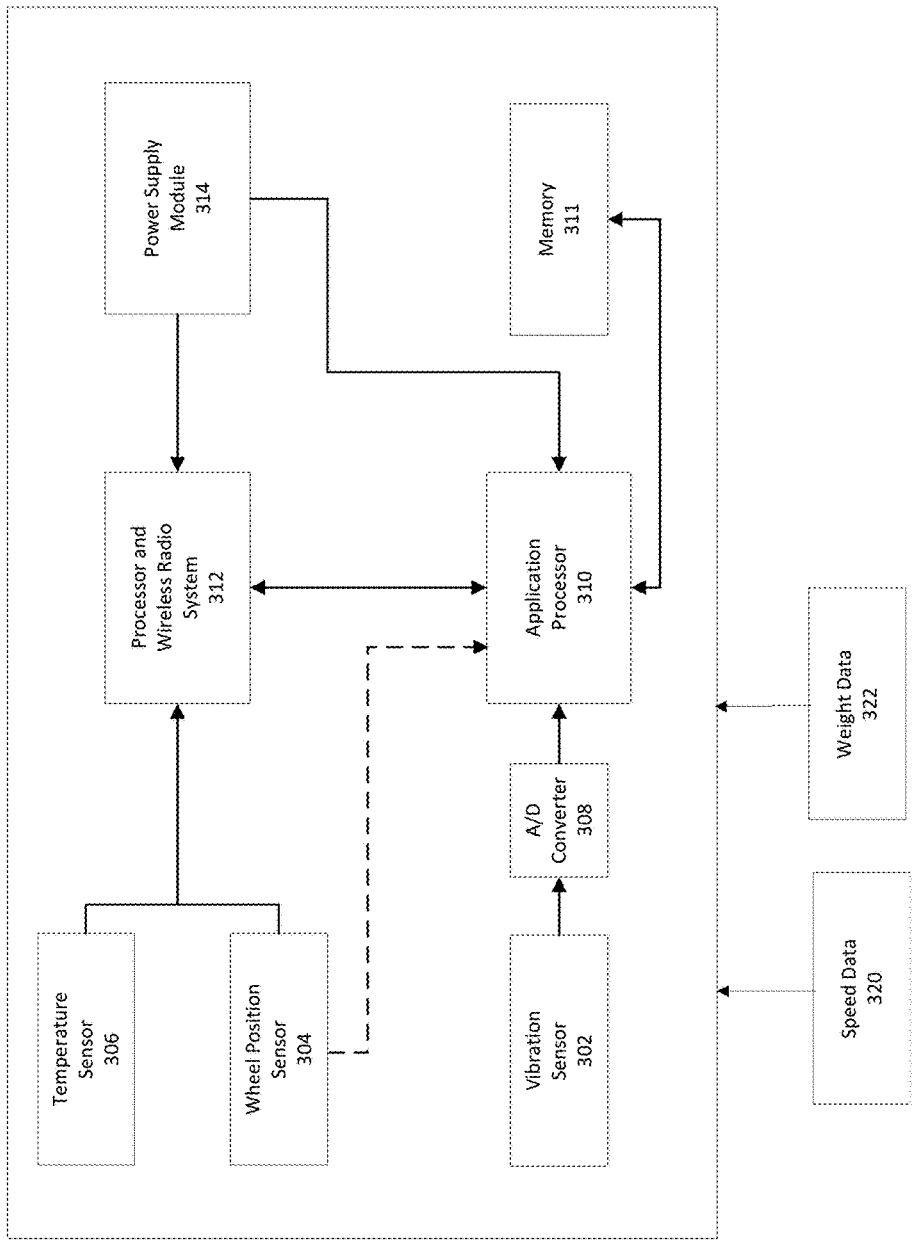
FIG. 3 is a block diagram showing the electrical structure of a wheelset health system (WHS) in accordance with examples described in this application.

FIG. 3 shows a block diagram of the WHS 300 in accordance with various embodiments of the invention. As previously described, in certain embodiments, WHS 300 may be implemented as a WSN 104 and act as part of a railcar-based network 105, in which case data, processed information (i.e. the diagnostics results) and flags indicating detected conditions and/or a pending or predicted failure mode may be communicated off-railcar via communications path 222 to a remote location, likely a remote railroad or shipper operation center 222. Flags indicating detected conditions and/or pending predicted failure mode may also be communicated to locomotive 208 via train-based network 207, of which CMU 101, deployed on the same railcar as WHS 300, is a part. In certain embodiments, the WHS 300 may be configured to operate within a system utilizing an IEEE 802.15.4e IPv6 compliant proprietary or open network communication standard protocols or other type of network.

In alternate embodiments, WHS 300 may be implemented as a stand-alone unit, and may communicate data, processed information (i.e. the diagnostics results), detected conditions and/or flags indicating pending or predicted failure modes via communication with a wayside detector, remote operations center 122 or remote server. The wayside detector may have multiple functions. For example, a wayside detector may include an RFID tag reader, which may be located, for example, at a railyard, or along any portion of track. The wayside detector may have a means of communicating remotely with the remote railroad operation center 222.

With reference to FIG. 3, in certain embodiments, the WHS 300 may include a vibration sensor (i.e., an accelerometer) 302, for sensing vibration. Readings from vibration sensor 302 may be converted to digital form via an analog-to-digital converter 308 relay may be processed by application processor 310. In certain embodiments, WHS 300 may also include a wheel position sensor 304, and a temperature sensor 306. In certain embodiment, WHS 300 may use external data supplied from a source or sources external to WHS 300, for example, speed data 320 and weight data 322.

In preferred embodiments, WHS 300 may use data from vibration sensor 302, and/or temperature sensor 306 to identify and diagnose possible defects and anomalies in the wheelset. In certain embodiments, data regarding the speed of the railcar and the weight of the railcar, supplied from external sources, may also be used. In some embodiments, the vibration data, temperature data, speed data and weight data, or any combination thereof, may be processed by artificial intelligence ("AI") algorithms on board WHS 300 to identify problems in the early stages of the development. Such AI algorithms, in certain embodiments, can be implemented as machine learning models trained to recognize vibration patterns predictive of various failure modes. In some embodiments, data from temperature sensor 306 may also be used as input to the machine learning models.

Figure 7:
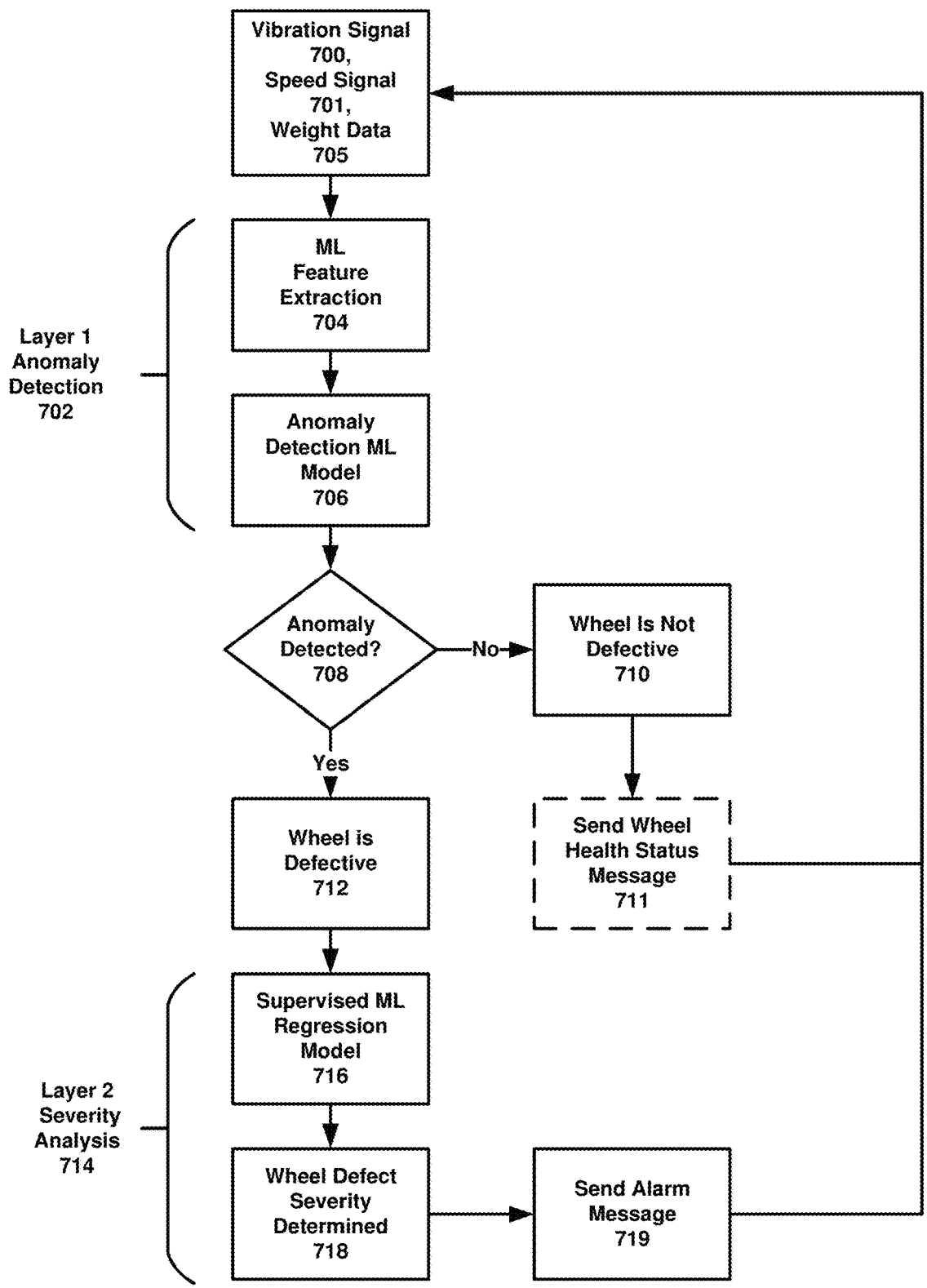
FIG. 7 is a flow chart showing the detection and severity of faults occurring with respect to the wheel of the wheelset.

The AI algorithms may comprise one or more classifiers, neural network models or other machine learning models, for example, support vector machines or random forests to predict and classify the condition of bearings into separate categories (e.g. non-defective, cone defect, cup defect, roller defect, combination, etc., as shown in FIG. 7). The models may be trained using time and frequency domain features extracted from historical field and lab data. When a new signal is captured by the sensor, the features are extracted from it and are fed to the trained model for fault classification and severity analysis. If the algorithm detects an alarm or defect condition, it automatically verifies the condition by retrying its measurement and analysis to rule out the effect of transient conditions and reduce the number of false alarms. If the alarm or defect condition is verified as positive or valid then the alarm or defect condition may be transmitted to a remote operations center 222 or a remote server. If the alarm or defect condition is found to be invalid, then, optionally, the condition is not sent to the remote operations center or remote server.

The vibration sensor 302, in preferred embodiments, produces a signal indicative of vibrations sensed in the wheelset. Vibration data may be collected from a vibration sensor 302, which may be an analog piezo-electric accelerometer or acoustic microphone mounted on or near the bearing adapter. The signal from vibration sensor 302 may be converted to digital samples using an analog-to-digital converter 308. The vibration sensor 302 will preferably include a wide frequency response and dynamic range and will preferably have a high resonant frequency. Further, it is preferred that vibration sensor 302 have an ultra-low rate of power consumption, making it an excellent choice for diagnostics and condition-based monitoring applications. In certain embodiments, vibration sensor 302 may be embedded directly in the bearing adapter without any physical contact to the sensor enclosure to avoid introducing any potential unwanted frequency content from the enclosure to the measured signal.

In certain embodiments, the analog vibration signals are sampled. The sampling rate of the analog vibration signal may vary. The application processor 310 is preferably a standard, commercially-available, low-power processor, and is responsible for collecting and processing vibration data derived from acceleration signals. The diagnostics algorithms and machine learning models are stored, implemented and run in memory 311. Preferably, the AI algorithms include one or more machine learning models trained to detect various specific vibration patterns that are predictive of future failures. Memory 311 may also permanently store any other programming necessary to communicate the results of the analyses to processor and wireless radio system 312.

In certain embodiments, the speed of the railcar may be used as an additional input to the AI algorithms. The speed may be calculated internal to WHS 300 using data from wheel position sensor 304 or may be provided from as external source, for example, from a GNSS, as shown in FIG. 3. In certain embodiments, the analysis of vibration and other data may only be performed if the current speed of the railcar is within a predetermined range (i.e., the railcar is moving).

In certain embodiments, the weight of the railcar may be used as an additional input to the AI algorithms. Railcar weight may be measured by an onboard weighing sensor or sensors (OWS), which may be implemented as a different type of WSN 104. The weight data may be provided to WHS 304, as shown in FIG. 3, and used in conjunction with the vibration data and the speed signal to identify defects and to estimate the severity of the defect in terms of Kips or other measures of force. (One Kip is equal to 1000 pounds-force and is the unit that wayside load impact detectors use to characterize the severity of the defect on the wheel). Because current standards for railcars are written based on Kip measurements, it is advantageous to be able to correlate vibration measurements to load impact and report the results in kips.

In preferred embodiments, processor and wireless radio system 312 is in communication with temperature sensor 306 and wheel position sensor 304.

In some embodiments, the temperature of the bearing can be monitored as a supplement to identify components with imminent failures, in the case wherein the vibration analyses have failed to identify the problem in earlier stages.

In some embodiments, the application processor 310 may be periodically awoken by the processor and wireless radio system 312 based on a time schedule, to perform the analysis. In other embodiments, it may be desirable for application module 310 to perform analyses on an as needed basis instead of doing continuous periodic analyses.

In one embodiment, the mileage passed by the railcar may be used to awake the WHS 300 to perform the analysis. In one embodiment, a wheel position sensor 304 may be used to determine the number of rotations the railcar wheel has made. The mileage passed by the railcar can then be calculated based on the number of wheel rotations. In other embodiments, a GPS sensor may be used to determine the mileage passed by the railcar. In other embodiments, WHS 300 may be awoken via an external source or may use another internal calculation to self-awake. For example, WHS 300 may periodically awake based on the passage of time. Based on the number of miles the railcar has passed, processor and wireless radio system 312 may cause the application processor 310 to power up to an "ON" state to perform the analysis. Once the analyses are complete, the processor and wireless radio system 312 receives the results of the analysis from application processor 310 and powers "OFF" application processor 310 until the next run. This powering ON and OFF based on miles passed avoids situations wherein the application module 310 is woken up when the railcar has been sitting idle for extended periods of time.

The use of wheel position sensor 304 also allows WHS 300 to calculate the rotational speed of the axle during the vibration signal measurement. This allows the normalization of the acceleration data and increases the signal to noise ratio. Having the exact or close to exact speed information yields cleaner vibration data for input to the AI models.

WHS 300 may be powered by power supply module 314 which, in preferred embodiments, comprises an internal long-term battery. In alternate embodiments, a solar cell or internal power harvesting device that derives power from the motion of the railcar may be used.

The processed results, which are indicators of the condition of the components of the wheelset, may be communicated externally by WHS 300 and reported via one or more of the aforementioned means.

Figure 8:
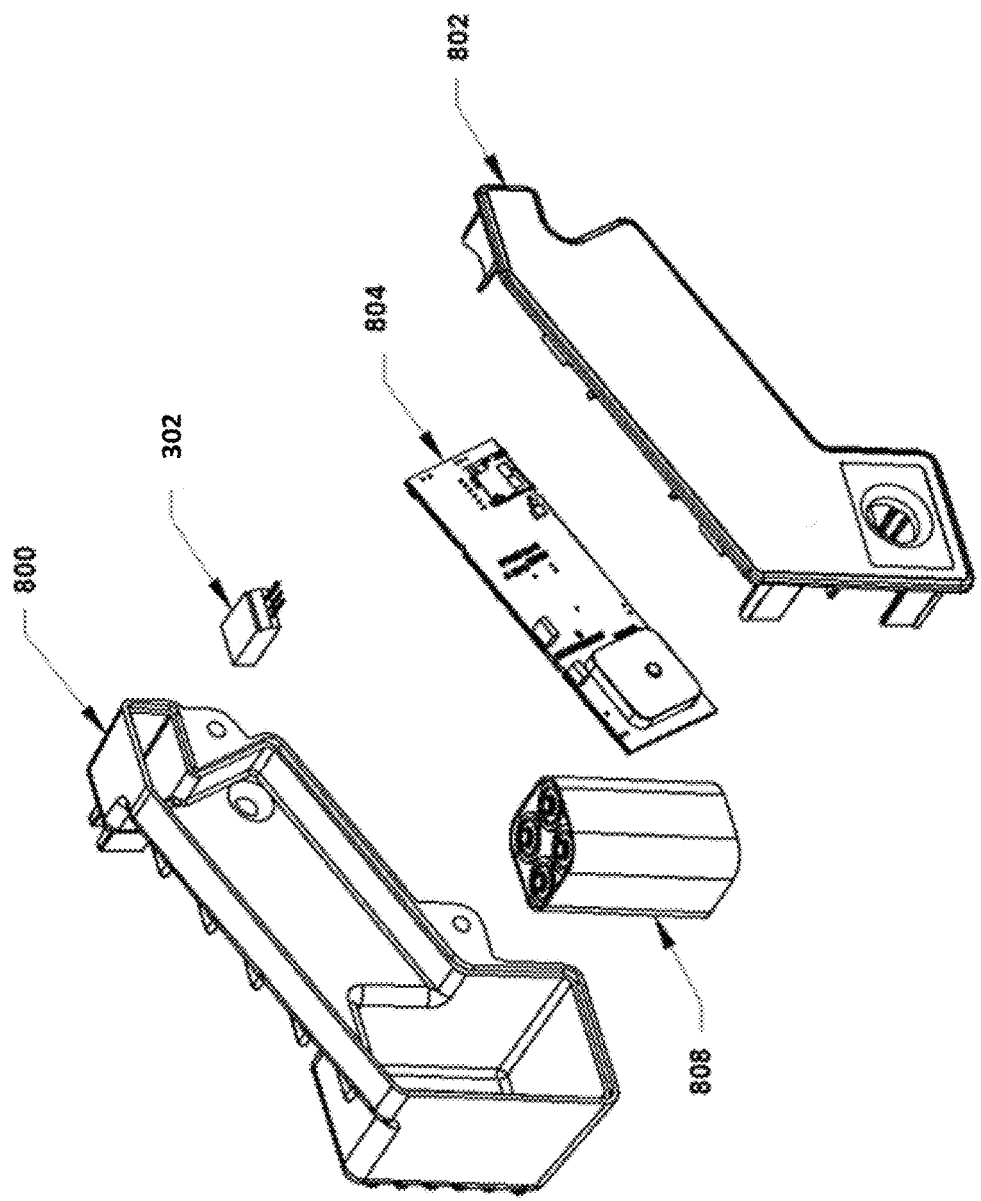
FIG. 8 is an exploded view showing the components of the WHS.

In preferred embodiments of the invention, WHS 300 may be housed in a weatherproof housing, such as the one shown in exploded view in FIG. 8, preferably rated at least IP67 in accordance with IEC standard 60529, providing protection from the components from dust and capable of withstanding water immersion. Preferably, the housing of WHS 300 will contain a potting material for further protection of the internal components.

Figure 4:
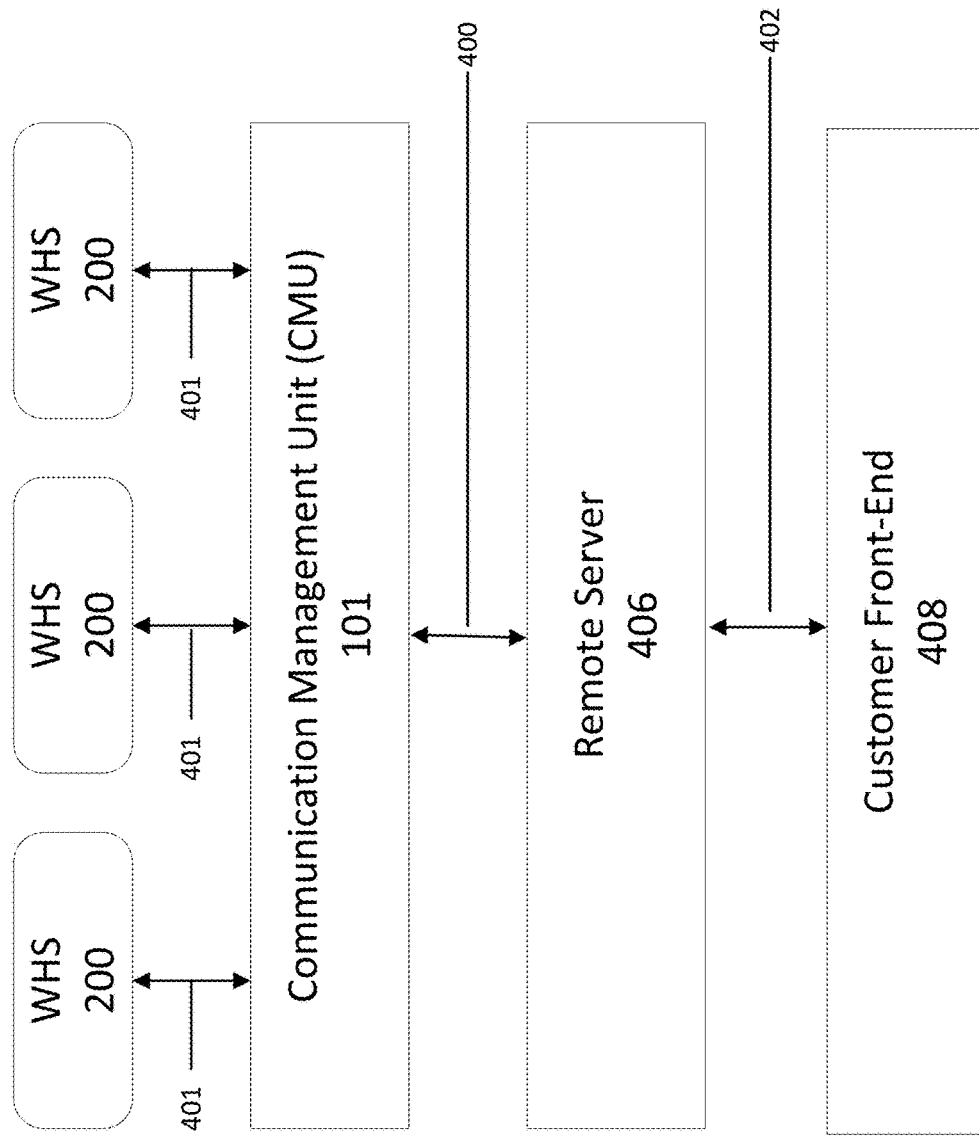
FIG. 4 is a block diagram showing a high-level view of the movement of data from multiple WHS's to the customer front-end.

FIG. 4 shows an overview of the means by which the results of the analysis is communicated from multiple WHS units 300 to an off-railcar destination. While FIG. 4 shows three WHS's 300, it should be realized by one of skill in the art that any number of WHS's 300 may be used in various embodiments. As shown in FIG. 4, a WHS 300 may communicate the results of its analysis via communications link 401, which, in preferred embodiments, may be a short-range wireless communication between WSN 104, which may be nodes in an ad hoc mesh, star network or other type of network, although communication links of any type may be utilized to communicate results, status reports and alarms to CMU 101. As shown in FIG. 3, processor and wireless radio system 312 in each WHS 300 is responsible for communicating the results to a gateway, which, in preferred embodiments, is CMU 101. In some embodiments, CMU 101 is the master of the railcar-based network or the center of the railcar-based network. In other embodiments, CMU 101 may be any other type of on-railcar device capable of collecting data from multiple WHS's 300 and communicating the results off-railcar to a remote operations center 222, remote server or locomotive 208.

CMU 101 may be in communication with a remote server 406, which may be responsible for collecting data from multiple railcar-based networks 105 and train-based networks 207. Remote server 406 may also be responsible for communicating information to CMU 101 and WHS's 300, for example, to configure WSNs 104 in a train-based network 207, or to provide updated machine learning models to WHS's 300. Communication between CMU 101 and remote server 406 may be any type of long-range wireless signal, for example, cellular, satellite, etc.

Customer front-end 408 may comprise a processor executing a program for displaying the results of various analyses to a user interface and for collecting and acting upon user input. Remote server 406 may communicate to customer front-end 408 via any means known in the art, for example, via any type of wireless signal or via a wired connection. It should be realized by one of skill in the art that remote server 406 and customer front end 408 may be implemented as a single unit or may be separate units, as shown in FIG. 4.

The WHS 300 provides several benefits. For example, alerts raised by the WHS 300 can be based on both vibration and temperature data. As described above, vibration signals can be measured at very high sampling rates suitable for bearing vibration monitoring and diagnostics and capable of analysis by AI algorithms capable of predicting failure modes, while temperature data may be analyzed to detect imminent failures. WHS 300 also has sufficient processing capability to perform computations and a significantly large amount of memory to store large signals for accurate vibration analysis. WHS 300 can utilize advanced analytic techniques such as deep learning for detecting and predicting bearing and wheel defects and failures. Raw data can be stored in WHS 300 and is able to be communicated off-railcar in both raw and processed form to wayside tag readers or via the networks. WHS 300 utilizes an advanced power management system for saving energy while performing heavy computations. In some aspects, WHS 300 utilizes an advanced and novel technology for accurate measurement of real-time speed and mileage of the railcar.

The system also provides the option to report the final results (i.e. alarm levels based on the condition of the components from good to critical) as well as features (which are abstracts of raw signals) or raw data for further off-line analysis and investigation.

Figure 5:
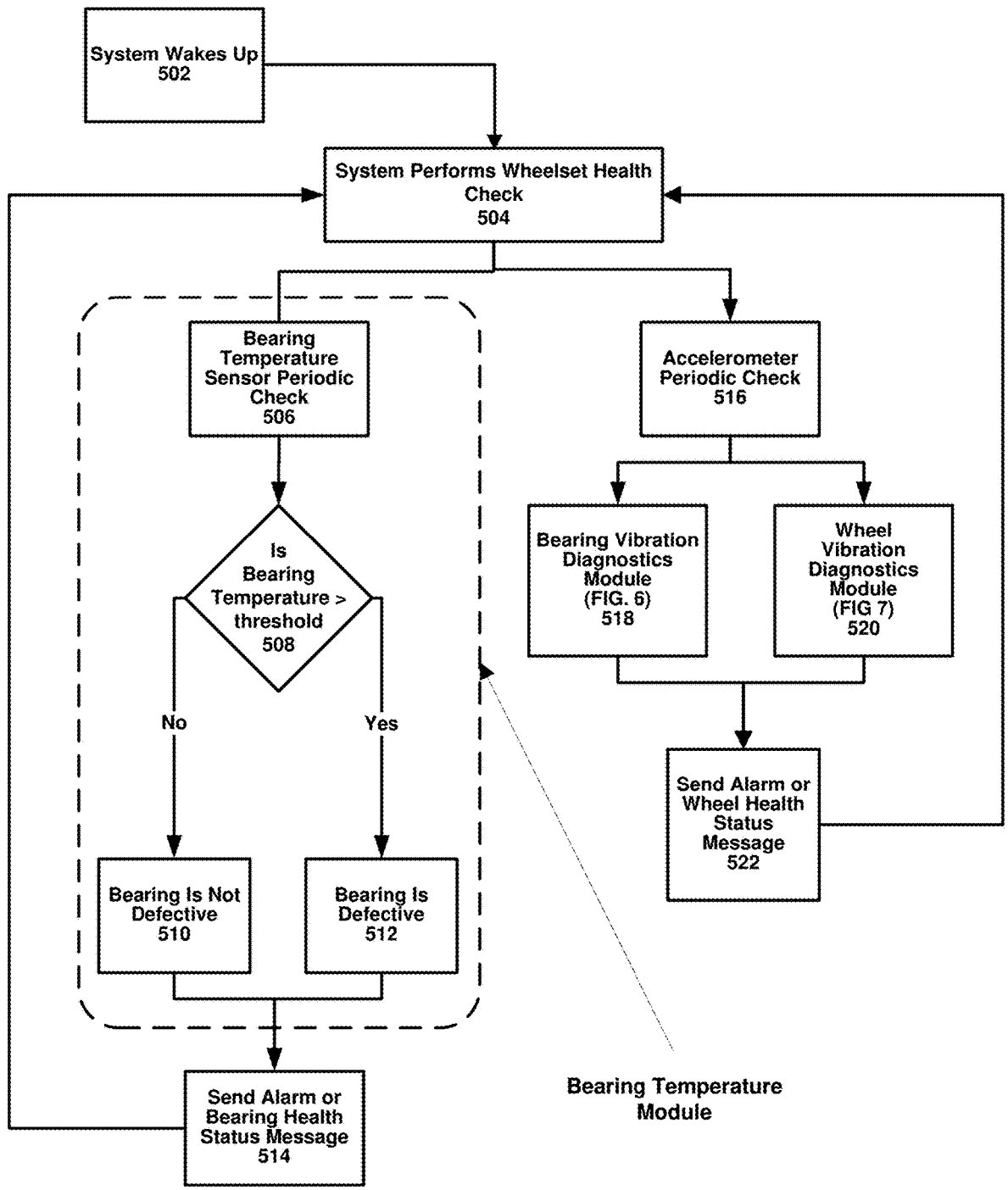
FIG. 5 is a flow chart showing the overall process for data analysis and failure prediction for the WHS.

FIG. 5 is a flowchart showing the overall process for the operation of WHS 300. At 502 it is determined if the system should be awoken, based on one or more of the previously-described methods. At 504, WHS 300 begins to perform a wheelset health check. The health check consists of two parts, a check of bearing temperature based on readings from temperature sensor 306, shown in FIGS. 3 and 11, to determine imminent failures, and an analysis of a vibration signal generated by accelerometer 302, shown in FIGS. 3 and 8, to predict failures in both the bearing and the wheel portions of the wheelset. Both the bearing temperature check and the analysis of the vibration signal occur periodically, determined by an elapsed time or by mileage traveled by the railcar 103, as determined by wheel position sensor 304, shown in FIG. 3, by using a GPS signal provided by CMU 101 or based on one or more user configurable thresholds. The rates at which the temperature check and vibration analysis take place may be variable, dependent upon previous analysis. For example, if a previous analysis determines that a low severity fault in the wheel or bearing is detected, the periodic rate may be shortened to check more often to make sure that the fault has not grown more severe over time.

Figure 11:
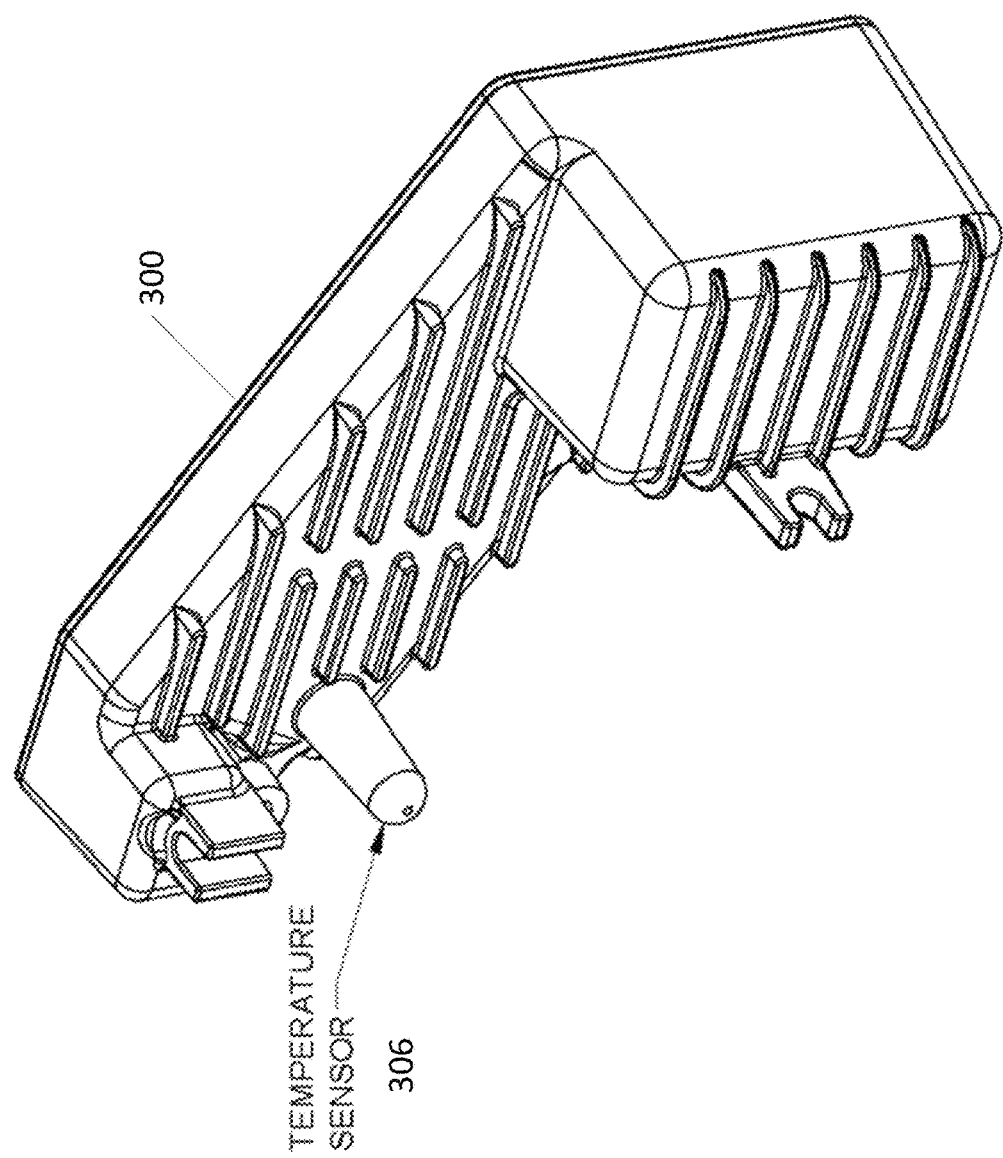
FIG. 11 shows a WHS having an integral temperature sensor.

With reference to FIG. 5, at 506 the periodic bearing temperature check is started. A temperature reading may be obtained from temperature sensor 306, as shown in FIG. 3. The temperature sensor 306 may be integral with WHS 300, as shown in FIG. 11, or temperature data may be obtained from a source external to WHS 300. At 508, it is determined if the bearing temperature has exceeded a predetermined threshold and, if so, it is determined at 512 that the bearing is defective, and failure of the bearing is imminent. If the temperature is below the predetermined threshold at 508, it is determined at 510 that the bearing is not critically defective. At 514 an alarm may be sent off-unit in the case that the bearing is determined to be defective or a health status message may be sent off-unit if it is determined that the bearing is not defective. To conserve power, the sending of the health status message when the bearing is not found to be defective at 510 may be optional.

With further reference to FIG. 5, at 516, the periodic check of the vibration data from accelerometer 302 occurs. The analysis of the vibration data has two parts, one regarding the vibration from the bearing portion of the wheelset at 518 and explained below with reference to FIG. 6, and another part regarding the vibration from the wheel portions of the wheelset at 520, explained below with reference to FIG. 7. In either case, at 522 an alarm or wheelset health message may be sent off-unit, depending upon the type of defect which is been detected and the severity of the defect, as determined by the machine learning models. As with the temperature data the sending of a wheel set health status message, in the event that no defects are found may be optional to conserve power.

Figure 6:
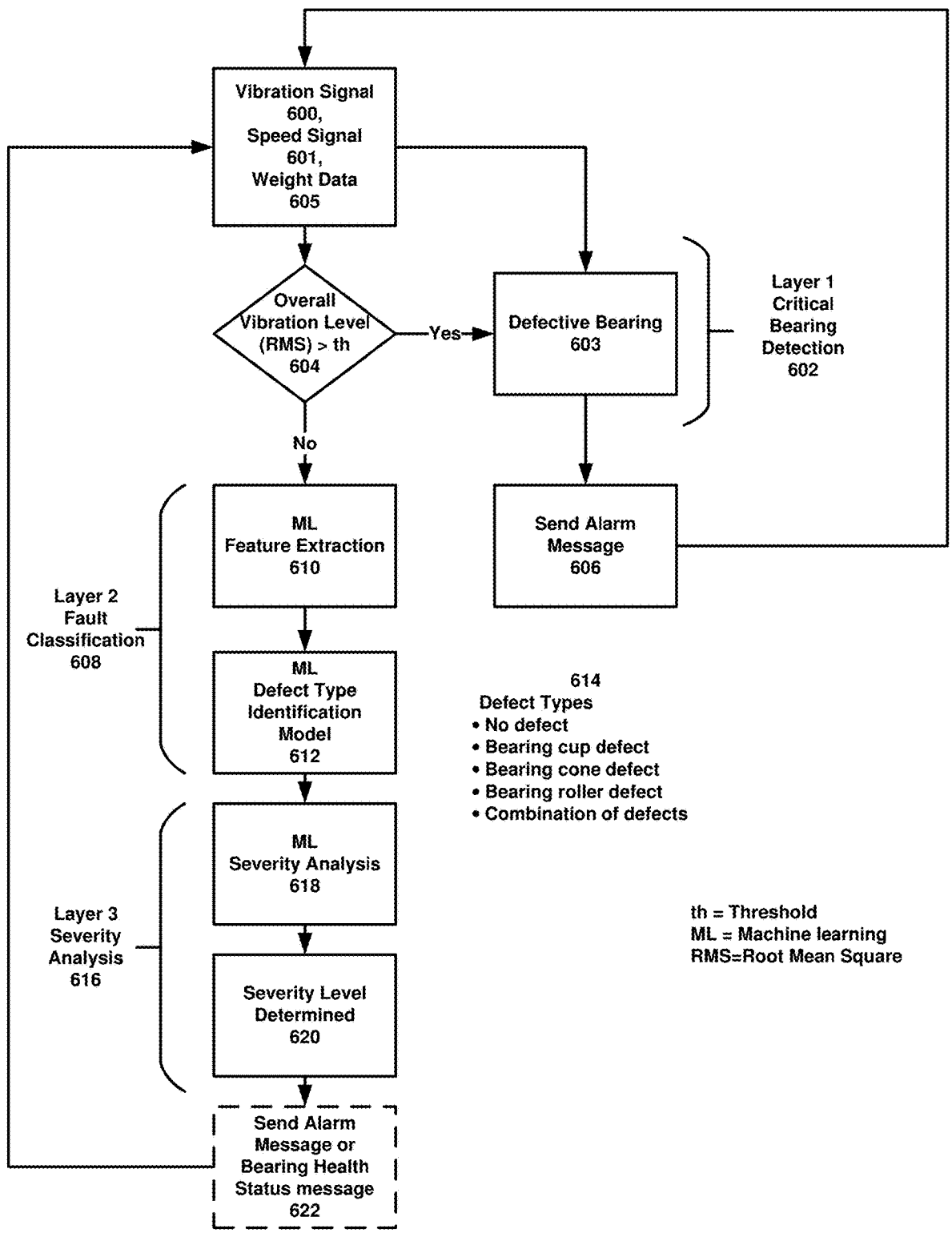
FIG. 6 is a flow chart showing the detection, classification of faults occurring and the severity of faults with respect to the bearing of the wheelset.

FIG. 6 shows a flow chart depicting the process by which faults are detected in the bearing portion of the wheelset. After the WHS 300 is awoken, by any of the methods previously discussed, vibration signal 600 is collected for a predetermined period of time. Speed signals 601 and weight data 605 may also be collected. In certain embodiments, the analysis may only be performed if the speed of the railcar is determined to be within in a pre-determined range. In Layer 1 (Critical Bearing Detection) 602 of the flow chart, it is determined if there is a critical defect in the bearing. If the (RMS of) overall vibration level is determined, at 604, to be above a predetermined threshold, it will be impossible to do Layer 2 (Fault Classification) and Layer 3 (Severity Analysis), as the vibration would make it impossible to do the feature extraction necessary for either fault classification or severity analysis. Vibration levels above the predetermined threshold generally indicate an immediate fault in the bearing, sometimes referred to as a "growling bearing". If a critical bearing fault is detected at 603, that is, when the overall vibration level is above the predetermined threshold, an alarm is immediately generated at 606 and transmitted off-unit. Speed signal 601 and weight data 605 may also be inputs to the Layer 1 analysis.

If no immediate critical bearing fault is detected at the Layer 1 analysis 602, vibration signal 600 and, optionally, speed signal 601 and weight data 605, are sent to Layer 2 608 to determine if a fault is detected and for fault classification. Vibration signal 600 and speed signal 601 are analyzed, at 610, to extract features from the signal. The features may be, for example, the RMS of the vibration signal or a variance of the vibration signal. The features are passed through machine learning defect type identification model 612 wherein a pattern may be recognized in the features of the signal as being predictive of a developing defect in the bearing. Machine learning defect type identification model 612 is a machine learning model which has been trained to identify and classify defects in the wheels and bearings based on signals from vibration and speed sensors. The machine learning defect type identification model 612 is capable of classifying detected faults to a specific component of the bearing or to faults detected in a combination of the components of the bearing. The various types of faults are shown at 614, including a "no defect" condition indicative of no developing defect within any components of the bearing.

After analysis by the machine learning defect type identification model 612, the vibration signal 600 and, optionally, speed signal 601 and weight data 605, are sent to Layer 3 616 for analysis of the severity of the defect. If a fault is detected, Layer 3 severity analysis 618 utilizes a machine learning model to determine if the defect qualifies as a severe defect (i.e., a "level one" defect as defined by the Association of American Railroads (AAR) standards), which may require the issuance of an immediate alert off-unit. An alert whose severity is analyzed as being non-critical defect (i.e., "an AAR non-level one defect") may not be severe enough to raise an alert but, however, may be used to modify the behavior of the WHS. For example, the WHS may awake and sample the vibration signal 600 more often if a less severe fault is detected to determine if the defect is becoming more severe over time. Once the severity level is determined at 620, an alarm or heath status message may be sent off-unit at 622. Other actions may also be taken.

FIG. 7 shows a flow diagram showing the process for detecting anomalies in the wheel portion of the wheelset. Vibration signal 700 and speed signal 701 are collected for a predetermined time. Weight data 705 may also be collected. As with the analysis for the bearing, the analysis for the wheels may only be performed if the speed of the railcar is determined to be within a pre-defined range. Vibration signal 700, and, optionally, speed signal 701 and weight data 705, are analyzed by Layer 1 (Anomaly Detection) 702 to detect anomalies in the wheel. Features may be extracted from the vibration signal 700 at 704 and submitted to a machine learning model 706 capable of detecting patterns in the features of the vibration signal 700 and determining whether an anomaly in the wheel exists. At decision point 708, if there is no anomaly, the wheel is determined to be good at 710. The WHS 300 may optionally send a wheel health status notification that the wheel has been determined to be anomaly free off-unit at 711.

If, at decision point 708, an anomaly is detected, a wheel is determined to be defective at 712 and the Layer 2 (Severity Analysis) 714 performs analysis of the features to determine the severity of the anomaly. In a preferred embodiment, a supervised regression model may use the features extracted from the vibration signal 700 at 716 to determine the severity 718 of the defect. The severity 718 is a numeric number scaled to indicate the severity of the anomaly. The behavior of the WHS 300 may be altered by the severity of the anomaly. For example, an anomaly which is above a predetermined severity level may require that an immediate alert be sent off-unit, while, less severe anomalies may require, for example, that the vibration signal 700 be sampled more frequently to determine if the anomaly in the wheel has grown more severe over time. Various behaviors of the WHS 300 may be required based on the level of severity 718. If the severity level determined at 718 is sever enough, an alarm message may be sent off-unit at 719.

Several aspects of the analysis process may be configurable. For example, the threshold for determining a defect based on temperature, whether or not to send wheel or bearing health status messages when no defects are detected, the severity of a detected anomaly before an alarm is sent off unit and the frequency with which the temperature and vibration signals are sampled may all be configurable.

Note that vibration signal 600 used to predict and classify bearing defects and vibration signal 700, used to predict defects in the wheel may be the same vibration signal, however, the features extracted from the signal used to predict bearing failures may be different than those features extracted from the vibration signal to predict wheel failures.

FIG. 8 shows an exploded view of a WHS 300 showing the internal components. Enclosure 800 houses the components of the WHS 300 and is sealed by lid 802. Preferably, enclosure 800 and lid will 802 may be composed of a material resistant to fluctuations in temperature, moisture and other environmental factors which may affect the integrity of the enclosure. Enclosure 800 may be packed with a potting material to reduce extraneous vibrations on WHS 300. The main components of WHS 300 are mounted on circuit board 804 which may be powered by battery pack 808. Accelerometer 806 may be a separate component which plugs into circuit board 804, or maybe mounted directly on circuit board 804. Circuit board 804 contains one or more logic circuits programmed to determine when WHS 300 should be awoken, to collect temperature and vibration data and to do the analyses on the data discussed above to determine what action, if any, should be taken. One of skill in the art would realize that enclosure 800 and lid 802 may be of any shape, and the shape may be determined by the desired point of mounting on the wheelset.

Figure 9:
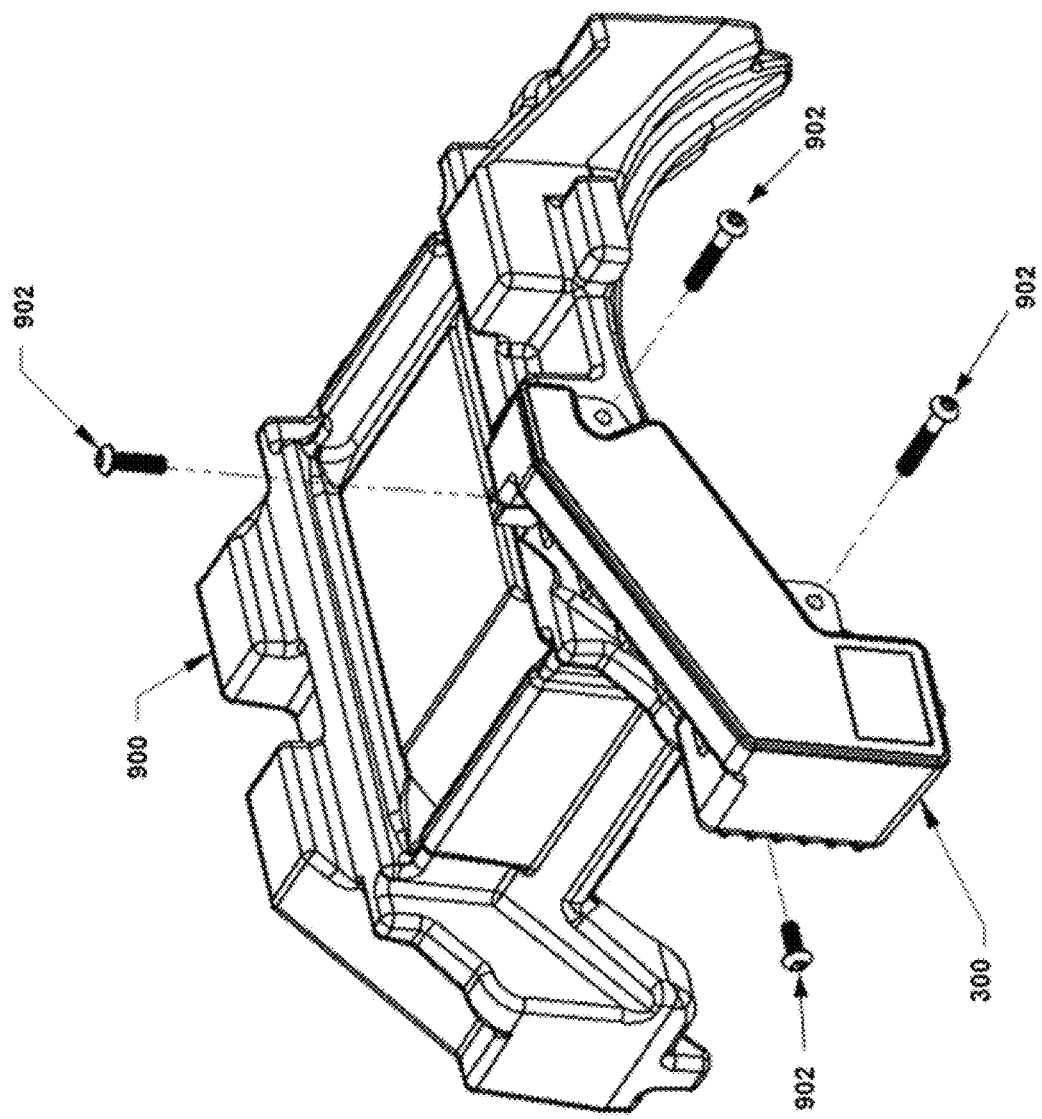
FIGS. 9-10 show two views of a WHS being attached to the bearing adapter.
Figure 10:
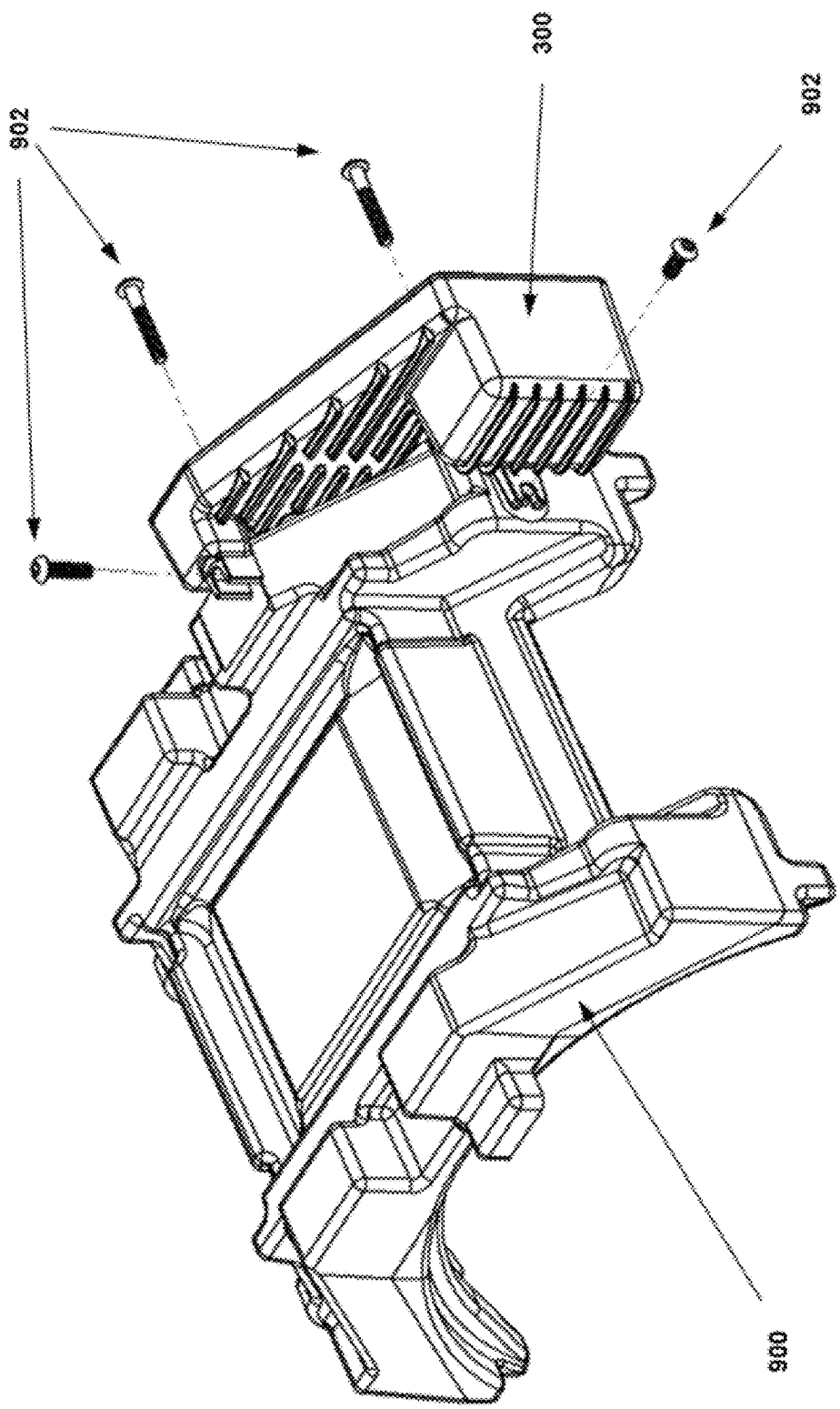

FIGS. 9-10 show one method of mounting WHS 300 by mounting with a plurality of machine screws 902 directly to the bearing adapter 900. In alternate embodiments, other means, for example, adhesives, or welding may be used to attach WHS 300 to the bearing adapter. The illustration of the mounting of WHS 300 on bearing adapter 900 shown in FIGS. 9-10 are exemplary in nature, and, as should be realized by one of skill in the art, the location for the mounting as well as the method of mounting may deviate from the illustrated method without departing from the intended scope of the invention.

FIG. 11 shows WHS 300 in a perspective view to show the positioning of temperature sensor 306. As previously mentioned, temperature sensor 306 may be integral with WHS 300, as shown in FIG. 11, or WHS 300 may receive temperature readings from an external source. Temperature sensor 306 may be disposed in a hole drilled in the bearing adapter for acceptance of the sensor.

To those skilled in the art to which the invention relates, many modifications and adaptations of the invention will suggest themselves. Implementations provided herein, including implementations using various components or arrangements of components should be considered exemplary only and are not meant to limit the invention in any way. As one of skill in the art would realize, many variations on implementations discussed herein which fall within the scope of the invention are possible. Accordingly, the exemplary methods and apparatuses disclosed herein are not to be taken as limitations on the invention, but as an illustration thereof.

We claim:

1. A method for operating a wireless sensor node deployed on a railway asset, comprising:
   receiving, by a processor, vibration sensor data from one or more vibration sensors and bearing temperature data from a temperature sensor;
   performing, by the processor, wheelset health check operations comprising:
      using the vibration sensor data as an input to a machine learning model that is trained to detect vibration patterns predictive of future failures of both a bearing portion of the wheelset and a wheel portion of the wheelset; and
      in the case that none of the vibration patterns were detected by the machine learning model, using the bearing temperature data as another input to the machine learning model that is trained to detect a fault or defect in the bearing portion of the wheelset; and
   altering, by the processor, a behavior of the wireless sensor node based on a result from performance of the wheelset health check operations.

2. The method according to claim 1, wherein the altering the behavior of the wireless sensor node comprises changing a threshold value.

3. The method according to claim 1, wherein the altering the behavior of the wireless sensor node comprises changing when a signal is to be wirelessly sent from the wireless sensor node.

4. The method according to claim 1, wherein the altering the behavior of the wireless sensor node comprises changing a rate at which the vibration sensor data and or the bearing temperature data is sampled.

5. The method according to claim 1, wherein a same portion of the vibration sensor data is used to (i) predict a future failure of the bearing portion of the wheelset and (ii) predict a future failure of the wheel portion of the wheelset.

6. The method according to claim 1, further comprising periodically performing iterations of the wheelset health check operations at a periodic rate that is varied based on results of one or more previous iterations of the wheelset health check operations.

7. The method according to claim 1, wherein one of the vibration sensors is embedded directly in a bearing adapter.

8. The method according to claim 1, further comprising:
computing a current speed of the railway asset using data from a wheel position sensor; and
comparing the current speed to a predetermined range of speed values;
wherein an analysis of the vibration sensor data by the machine learning model to detect the vibration patterns is only performed when the current speed falls with the predetermined range of speed values.

9. The method according to claim 1, further comprising:
monitoring a speed of the railway asset; and
comparing the monitored speed to a predetermined range of speed values;
wherein the wheelset health check operations are performed only when the monitored speed falls with the predetermined range of speed values.

10. The method according to claim 1, further comprising:
receiving weight data specifying a weight of the railway asset; and
using the weight data as an input to a machine learning model that is trained to identify a defect on a wheel of the wheelset and estimate a severity of the defect in terms of a unit of force.

11. The method according to claim 1, further comprising:
receiving vibration measurements taken by one of the vibration sensors coupled to the wheelset; and
performing operations by a machine learning model that is trained to correlate the vibration measurements to load impact; and
reporting correlation results in terms of a unit of force.

12. The method according to claim 11, wherein the weight data is received from a weighing sensor onboard the railway asset.

13. The method according to claim 1, further comprising:
obtaining a mileage passed by the railway asset; and
awaking the wireless sensor node at a time determined based on the mileage.

14. The method according to claim 13, wherein the awaking comprising causing the processor to transition from an OFF state to an ON state in which the processor performs the wheelset health check operations.

15. The method according to claim 14, further comprising causing the processor to transition back to the OFF state upon completion of the wheelset health check operations.

16. The method according to claim 13, wherein the mileage is obtained based on a number of wheel rotations indicated by wheel positions data received from a wheel position sensor disposed on the wheelset.

17. The method according to claim 13, wherein the mileage is obtained based on global positioning sensor data.

18. A wireless sensor node, comprising:
an enclosure configured to be mounted on a wheelset of a railway asset;
one or more vibration sensors configured to measure vibrations associated with the wheelset;
a temperature sensor configured to measure temperatures associated with the wheelset;
a wireless communication system configured to wirelessly transmit a signal; and
a circuit that is disposed in the enclosure and configured to perform wheelset health check operations comprising:
using vibration sensor data as an input to a machine learning model that is trained to detect vibration patterns predictive of future failures of both a bearing portion of the wheelset and a wheel portion of the wheelset; and
in the case that none of the vibration patterns were detected by the machine learning model, using bearing temperature data as another input to the machine learning model that is trained to detect a fault or defect in the bearing portion of the wheelset;
wherein a behavior of one or both of the wireless communication system and the circuit is altered based on a result from performance of the wheelset health check operations.

19. The wireless sensor node according to claim 18, wherein the enclosure is configured to be mounted directly to a roller bearing adapter of the wheelset of the railway asset.

20. The wireless sensor node according to claim 19, wherein the temperature sensor is received in an aperture formed in the roller bearing adapter when the enclosure is mounted directly to the roller bearing adapter of the wheelset of the railway asset.

21. The wireless sensor node according to claim 18, wherein the one or more vibration sensors are entirely disposed within the enclosure, while the temperature sensor at least partially extends out and away from an exterior surface of the enclosure.

22. The wireless sensor node according to claim 18, wherein the behavior of the circuit is altered by comprises changing a threshold value.

23. The wireless sensor node according to claim 18, wherein the behavior of the wireless communication system is altered by changing when the signal is to be wirelessly transmitted.

24. The wireless sensor node according to claim 18, wherein the behavior of the circuit is altered by changing a rate at which sensor data is sampled.

25. The wireless sensor node according to claim 18, wherein a same portion of the vibration sensor data is used to (i) predict a future failure of the bearing portion of the wheelset and (ii) predict a future failure of the wheel portion of the wheelset.

26. The wireless sensor node according to claim 18, wherein the circuit is further configured to re-perform the wheelset health check operations at a periodic rate that is varied based on results of one or more previous iterations of the wheelset health check operations.

27. The wireless sensor node according to claim 18, wherein the circuit is further configured to:
  compute a current speed of the railway asset using data from a wheel position sensor; and
  compare the current speed to a predetermined range of speed values;
  wherein an analysis of the vibration sensor data by the machine learning model to detect the vibration patterns is only performed when the current speed falls with the predetermined range of speed values.

28. The wireless sensor node according to claim 18, wherein the circuit is further configured to:
  monitor a speed of the railway asset; and
  compare the monitored speed to a predetermined range of speed values;
  wherein the wheelset health check operations are performed only when the monitored speed falls with the predetermined range of speed values.

29. The wireless sensor node according to claim 18, wherein the circuit is further configured to:
  receive weight data specifying a weight of the railway asset; and
  use the weight data as an input to a machine learning model that is trained to identify a defect on a wheel of the wheelset and estimate a severity of the defect in terms of a unit of force.

30. The wireless sensor node according to claim 18, wherein the circuit is further configured to:
  use the machine learning model to correlate the vibration measurements to load impact; and
  report correlation results in terms of a unit of force.

31. The wireless sensor node according to claim 18, wherein the circuit is further configured to:
  obtain a mileage passed by the railway asset; and
  awake the circuit at a time determined based on the mileage.

32. The wireless sensor node according to claim 18, wherein an awaking of the circuit causes the circuit to transition from an OFF state to an ON state in which the circuit performs the wheelset health check operations.

33. The wireless sensor node according to claim 18, wherein the circuit is causes to transition back to the OFF state upon completion of the wheelset health check operations.

\* \* \* \* \*